J. J. Tucker.
Hedge Planter.

Nº 90,703.  Patented Jan. 1, 1869.

Witnesses:
Saml. F. Marr
Randolph Cagle

Inventor:
J. J. Tucker
by Prindle & Dyer, Attys.

J. J. Tucker.
Hedge Planter.
No. 90,703. Patented Jun. 1, 1869.

Witnesses:
Sam'l F. Marr
Randolph Cayle

Inventor:
J. J. Tucker
by Prindle & Dyer Atty.

United States Patent Office.

J. J. TUCKER, OF EUGENE, ILLINOIS.

Letters Patent No. 90,703, dated June 1, 1869.

---

IMPROVEMENT IN HEDGE-PLANTERS.

---

The Schedule referred to in these Letters Patent and making part of the same.

---

*To all whom it may concern:*

Be it known that I, J. J. TUCKER, of Eugene, in the county of Knox, and in the State of Illinois, have invented certain new and useful Improvements in Hedge-Planters; and do hereby declare that the following is a full, clear, and exact description thereof, reference being had to the accompanying drawings, being a part of this specification, in which—

Figure 1:
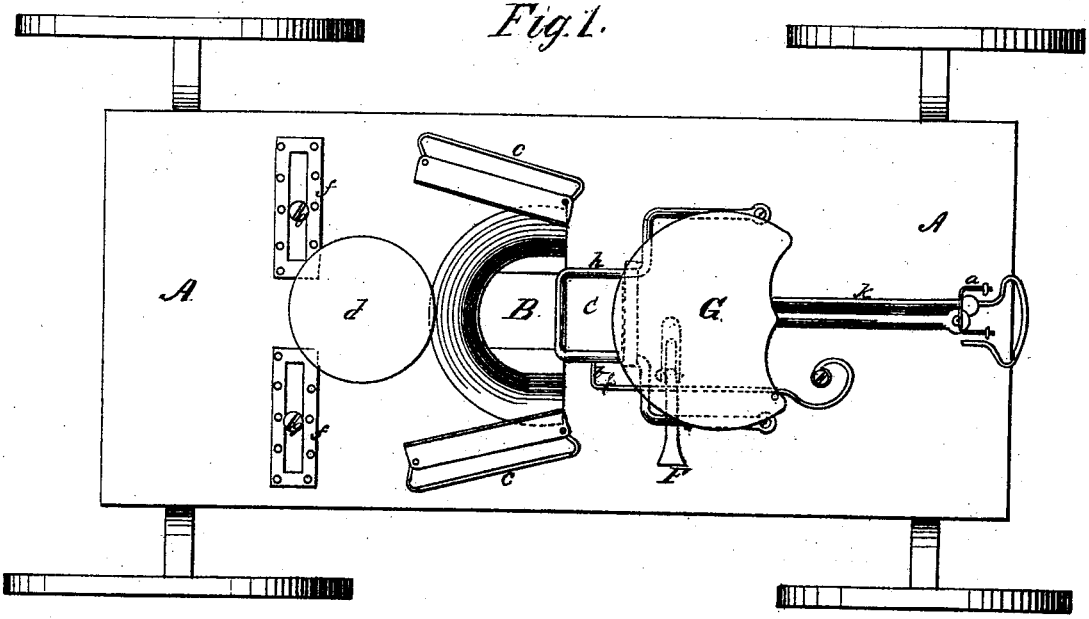
Figure 2:
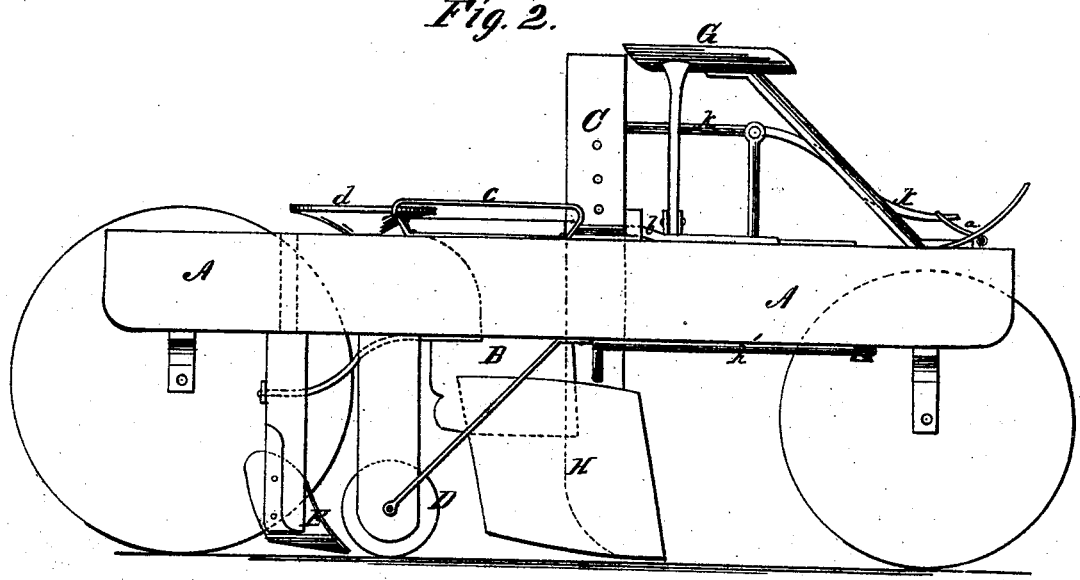
Figure 3:
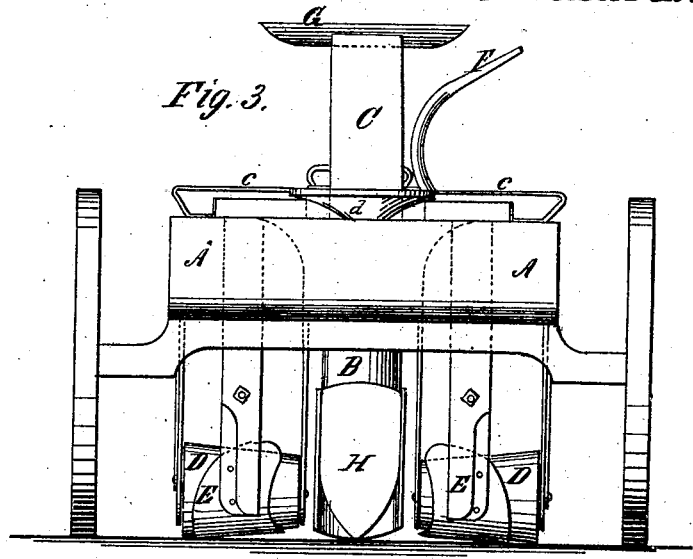

Figure 1, sheet 1, is a plan view of the hedge-planter;

Figure 2, sheet 1, is a side elevation of the same;

Figure 3, sheet 2, is a rear-end elevation of the same; and

Figure 4:
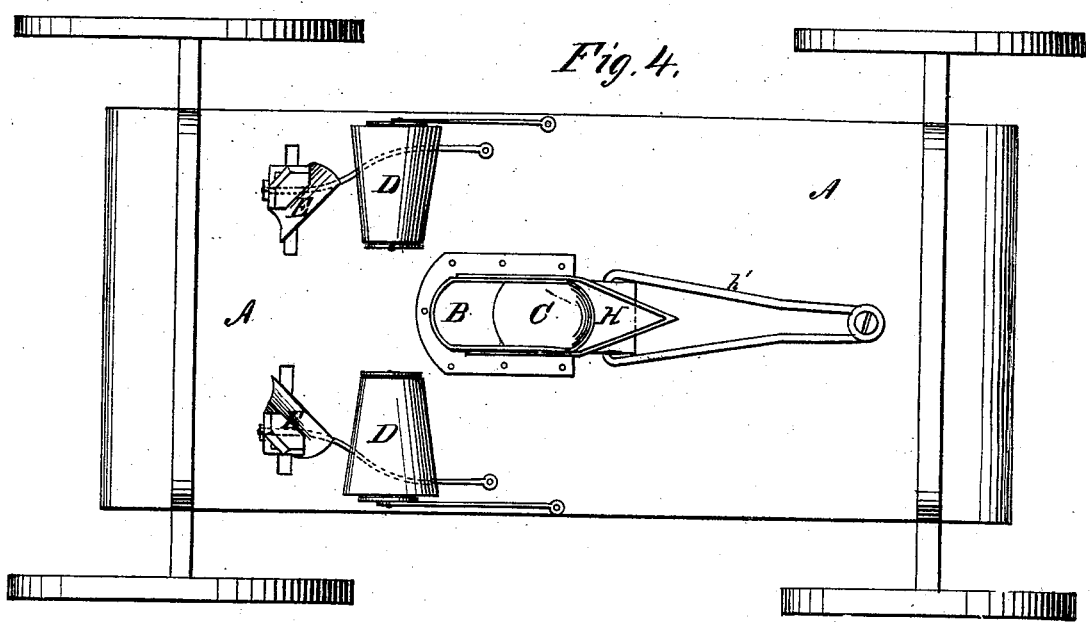

Figure 4, sheet 2, is a plan view of the bottom of the same.

Like letters of like kinds denote like parts in each figure.

This device is designed for the planting of hedges in prairie-countries, in a more rapid, effective, and economical manner than the same has been done heretofore, by the use of a suitable carriage upon wheels, drawn by a team, and provided with apparatus for carrying a sufficient quantity of shoots for setting, for plowing and preparing the ground for their reception, for covering them with earth, and leaving them in a condition for growth, performing the whole of this work, and completing the planting of a hedge as rapidly as a team can walk.

This machine is more specifically described as follows, viz:

In the centre of a solid wagon-body, A A, mounted in the usual manner, upon wheels, with a seat, G, for the driver, and intended to be drawn by a team, an orifice is made, which is protracted toward the ground by a sheet-metal casing, forming a hopper, B, through which shoots to be planted are dropped by the helper, whose seat $d$ is directly behind hopper B, and who takes the shoots from suitable racks, $c\ c$, on each side of him.

In the front of hopper B is a plow-standard, C, which is upright, movable up and down in a groove, and secured on the upper and lower sides of wagon-body A A by suitable metal straps $h\ h'$.

To the bottom of standard C is attached firmly plow H, constructed of sheet-metal, with high mould-boards alike in shape, embracing the sides of hopper R, and causing the shoots to fall to the earth directly in the wake of the plow-point.

This plow-standard C is movable, as aforesaid, by means of lever K running back from the front of wagon-body A A, under the driver's seat G, where it is pivoted upon a suitable standard, entering loosely at its rear end into plow-standard C, and operated upon its front end by the foot of the driver, who is able, by pressure upon it, to raise said plow-standard C and plow H to a suitable distance.

The outer end of lever K is secured in place, holding the plow H, when raised, by a suitable bail-catch, $a$, attached to the front end of the top of wagon-body A A.

The plow-standard C is also retained in position up and down by means of spring-rod $b$ upon the top of said wagon-body A A. One end of said spring-rod being fast and the other end bending at a right angle, enters into shallow holes placed in series up and down in the side of said plow-standard C, and keeps it in place.

This spring $b$ is regulated by means of lever F, suitably pivoted, the upper end of which comes up by the side of the driver's seat, and the lower end embraces spring $b$, and is operated by the foot of the driver, who presses said lever F, and thus moves spring $b$ back, and disengages its end from the holes in said standard C, allowing said standard to fall by its own weight upon the ground. When the driver takes his foot from said lever F, spring $b$ flies back, and entering one of the holes in said plow-standard, retains it in place.

Behind plow H, and on each side of it, and journalled upon standards fastened to the bottom of wagon-body A A, and suitably braced, are two earth-rollers D D, with an inward slope, or larger at their outer than at their inner ends.

Behind rollers D D are covering-shovels E E, upon standards whose tops are tenoned into mortises $f\ f$, reaching through and nearly across the rear end of wagon-body A A, and adjustable laterally at suitable distances, by means of screws $g\ g$, with heads broader than the width of the mortises, which screws pass down into the top ends of said shovel-standards, and serve, when screwed down tightly, to keep them in position.

Upon these shovel-standards, and at their bottoms, said covering-shovels E E are secured diagonally, in such a manner, as in operation to scoop the earth toward a common centre.

These shovels E E have their lower parts turned up to nearly a right angle with their faces, and their bottoms, as well as those of the rollers D D, should be, when the machine is in operation, a little above the point of plow H.

In operating this machine, when afield, with a team, a driver and helper, with the racks $c\ c$ full of shoots, and driven in the desired direction, plow H enters the earth and makes a furrow, the helper drops the shoots, end downward, into hopper B sufficiently fast, rollers D D press a little earth around them as they touch the ground, and the covering-shovels E E following, cast sufficient dirt upon them to set them properly.

By means of screws $g\ g$, the shovels E E are adjusted such a distance apart as may be best adapted to cover the shoots, and, by means of levers F and K, and spring $b$, the driver may raise the plow to the desired distance, or entirely above the ground, so that it will not obstruct the movements of the machine.

What I claim as my invention, and desire to secure by Letters Patent, is—

Plow H, with plow-standard C and adjustable apparatus of levers F and K and spring b, as above described, substantially as and for the purpose aforesaid.

Also, hopper B, in connection with plow H and adjustable plow-standard C, as before set forth, substantially as and for the above-named purpose.

Also, earth-rollers D D, in combination with plow H, adjustable plow-standard C, and hopper B, all as described, substantially as and for the purpose before mentioned.

Also, covering-shovels E E, adjustable laterally in in mortises f f, by screws g g, in combination with earth-rollers D D, plow H, adjustable plow-standard C, and hopper B, substantially as and for the purpose before named.

Also, the hedge-planter, herein described, consisting of wagon-body A A, mounted upon wheels, with plow H, adjustable plow-standard C, hopper B, earth-rollers D D, and covering-shovels E E, operated and constructed as aforesaid, substantially as and for the purpose described.

In testimony that I claim the foregoing, I have hereunto set my hand, this 15th day of March, 1869.

J. J. TUCKER.

Witnesses:
GEORGE W. ANSTINE,
G. W. KRETZINGER.